Nov. 24, 1964  E. J. H. FIALA ETAL  3,158,178

SHIFTING MECHANISM

Filed July 6, 1961

*INVENTORS*
ERNST J. H. FIALA
RUDOLF ANDRES
BY
*ATTORNEYS*

United States Patent Office 3,158,178
Patented Nov. 24, 1964

3,158,178
SHIFTING MECHANISM
Ernst J. H. Fiala and Rudolf Andres, both of Sindelfingen, Kreis Boblingen, Germany, assignors to Daimler-Benz Aktiengesellschaft, Stuttgart-Unterturkheim, Germany
Filed July 6, 1961, Ser. No. 122,330
Claims priority, application Germany July 12, 1960
1 Claim. (Cl. 137—596.2)

The present invention relates to a mechanically actuated hydraulic shifting mechanism, especially for adjusting installations in motor vehicles in which a first hydraulic connecting channel is adapted to be selectively connected with a second or a third hydraulic connecting channel.

These shifting mechanisms may be interconnected into a pressure fluid circulatory system in such a manner that, for example, the first hydraulic connecting channel leads to a hydraulic adjusting motor, with the aid of which is achieved some adjustment or actuation, for instance, of the windows, doors, seats, etc., in motor vehicles. The supply of the pressure fluid to the hydraulic shifting mechanism may take place through the second hydraulic connecting channel whereby the fluid pressure is built up by any suitable pump means. Through the third hydraulic connecting channel takes place now the dischage of the pressure fluid out of the hydraulic shifting mechanism back into the suction line of the pressure fluid-circulatory system.

It is the aim of the present invention to achieve a hydraulic shifting mechanism of the type described hereinabove in a simple and compact manner. Furthermore, the hydraulic shifting mechanisms of the present invention, additionally, are to be capable of manufacture in a simple manner even in small constructions and are to possess relatively few and simple structural parts. These structural parts, in accordance with the present invention, themselves are also to be capable of manufacture in a simple manner and adapted to be installed into the hydraulic shifting mechanism in an effortless manner as well as disassembled therefrom without difficulty. Additionally, the hydraulic shifting mechanism according to the present invention should be usable for different purposes and therewith is to be adapted to the most differing conditions by simple exchange of individual structural parts or by simple adjustment at the hydraulic shifting mechanism itself.

The underlying problem is solved in accordance with the present invention by terminating the second hydraulic connecting channel as well as the third hydraulic connecting channel each in a respective bore which bores are each provided with at least one stepped bore portion and which are preferably identical and parallel and extend through the entire shifting housing, whereby spring-loaded valve body members are arranged in sealing relationship within these bores at the stepped bore portions thereof, and by enabling direct and alternate actuation of these valve body members by means of shifting pins guided within the bores whereby the second hydraulic connecting channel or the third hydraulic connecting channel is connected with the first hydraulic connecting channel.

As a result of such construction of the hydraulic shifting mechanism, the flow or passage channels may be constructed as simple bored or drilled apertures which are easy to manufacture even with very small cross sections. The valves and the shifting pins are simple machined parts, made for instance by turning, and may be manufactured economically especially if the valve and shifting pin form a unitary part. The bores accommodating the valves as well as the pressure springs and shifting pins may be manufactured identically as well as parallelly and therewith in an inexpensive manner, for example, by a special work tool. The valve springs may be readily removed by simple disassembly and may be replaced by other springs, for instance, having different spring characteristics whereby a different predetermined pressure may be maintained in the hydraulic adjusting motor with some constructions of the shifting mechanism. By reason of the relatively few structural parts of the shifting mechanism which are arranged parallelly to each other, a compact shifting housing is formed which may also be readily machined for small dimensions.

Accordingly, it is an object of the present invention to provide a hydraulic shifting mechanism of the type described hereinabove which eliminates the shortcomings and disadvantages of the prior art constructions noted hereinabove in an effective and simple manner.

It is another object of the present invention to provide a hydraulic shifting mechanism which involves relatively few, simple structural parts permitting a compact construction.

Still a further object of the present invention resides in the provision of a hydraulic shifting mechanism which not only may be manufactured in a simple and inexpensive manner but also involves relatively few structural parts which themselves may be readily machined as well as installed and removed from the shifting mechanism.

A further object of the present invention resides in a hydraulic shifting mechanism of such construction as to enable utilization thereof for different purposes and easy adaptation to the different conditions thereof.

These and other objects, features and advantages of the present invention will become more obvious from the following description when taken in connection with the accompanying drawing which shows, for purposes of illustration only, several embodiments in accordance with the present invention, and wherein FIGURE 1 is a longitudinal cross sectional view through a first embodiment of a shifting mechanism in accordance with the present invention;

Figure 1:
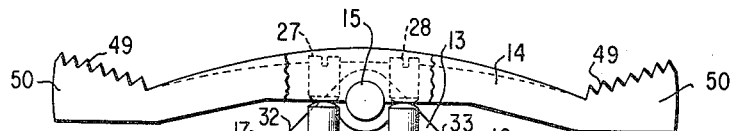

Referring now to the drawing wherein like reference numerals are used throughout the various views to designate like parts, and more particularly to FIGURE 1, reference numeral 1 designates therein the housing of the shifting mechanism. The pressure fluid is adapted to flow through the housing 1 of the shifting mechanism from the connecting channel 2, with valve 3 opened, through line 29 into the connecting channel 4. To the connecting channel 4 is operatively connected, for example, a suitable known hydraulic adjusting motor (not shown) forming no part of the present invention which, for instance, may include pistons adapted to be axially adjusted within a cylinder by the pressure fluid. By opening the valve 5, the pressure fluid is discharged from the hydraulic adjusting motor (not shown) through connecting channel 4 into the connecting channel 6 and thereupon flows back pressureless into the suction line of the fluid circulatory system. The valves 3 and 5 are kept normally closed by valve springs 9 and 10 and may be opened by separate shifting pins 11 and 12 in bores 33 and 32 in opposition to the spring force. The connecting channel 2 and the connecting channel 6 terminate within the cylindrical portions 7 and 8 of bores 30 and 31. The valve springs 9 and 10 are arranged within these cylindrical portions 7 and 8. A lever 14 is tiltably supported about the bolt member 15 within the bearing lug 13 of the housing 1. The lever 14 is provided at the upper surface thereof, on both ends 50, with a grooving or corrugation 49 for better manipulation thereof by the manual actuating force. The shifting pins 11 and 12 are adapted to be moved axially alternately by the manually actuated lever 14 for purposes of opening the valves 3 and 5 whereby either pressure fluid is supplied to the hydraulic adjusting motor or the pressure fluid is discharged therefrom. In the illustrated center position of lever 14 no pressure fluid can flow in the system, and the hydraulic adjusted motor operatively connected to the connecting channel 4 does not operate, i.e., is at a standstill. In order to assure a good closing of the valves 3 and 5, the shifting pins 11 and 12 have to possess a slight play, in the center position of the lever 14, between the lever 14 and the valves 3 and 5. This play may be selectively obtained by means of pins 27 and 28 inserted into the lever 14 and adjustable by screw threaded connections. The sealing of the shifting pins 11 and 12 and of the cylindrical portions 7 and 8 takes place by the sealing rings 16, 17, 18 and 19. These sealing rings 16, 17, 18 and 19 are disposed in annular grooves of the shifting pins 11 and 12 and of spool-like sealing plugs 20 and 21. The spool-like sealing plugs 20 and 21 may also be formed of two individual disk-like members with interposed sealing rings. The spool-like sealing plugs 20 and 21 are retained within housing 1 by means of pins 22 and 23, as more fully described in the copending application Serial No. 112,727 filed May 25, 1961, entitled "Plug-In-Connections" and assigned to the assignee of the present invention though any other suitable securing means of known construction may also be used. The supply and discharge lines are operatively connected with the connecting channels 2, 4 and 6, for instance, by threaded nipple connections or the like. The cross sections of the connecting channels 2, 4 and 6 may also appropriately be varied partly and selectively, depending on the ultimate purpose of the shifting mechanism, for example, by appropriate throttling means adapted to be screw-threaded into these connecting channels in order to exercise some influence on any viscosity change of the fluid or to permit the supply and/or discharge of the fluid to and from the hydraulic adjusting motor with different velocities. The housing 1 of the shifting mechanism is secured by means of screws or bolts in the bores 24, 25 and 26 at the respective part, for example, at the door or at the seat.

Figure 2:
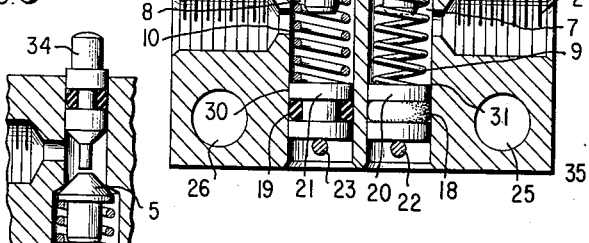
FIGURE 2 is a longitudinal cross sectional view through a modified embodiment of a shifting mechanism in accordance with the present invention.

FIGURE 2 illustrates a shifting mechanism in which the valves together with the shifting pins form a unitary part 42 and 43. As a result of the unitary construction of shifting pin and valve, the parts 42 and 43 are essentially non-loaded by the fluid pressure which prevails within the connecting channel terminating between the shifting pin and valve, due to the same piston surfaces at the shifting pin and valve. The supply of pressure fluid to the hydraulic motor takes place through the connecting line 2. If the part 43 is axially displaced downwardly, as viewed in the drawing, then the pressure fluid flows from connecting channel 2 through the cylindrical portion 7 and the connecting line 44 into the cylindrical portion 8 and from there into the connecting channel 4 and into an adjusting motor operatively connected therewith. By actuation of the part 42, the pressure fluid is conducted out of the adjusting motor and connecting channel 4 through the cylindrical portion 8 and the connecting channel 6 into a discharge line (not shown). In addition to the force of springs 9 and 10, there acts additionally on both parts 42 and 43 the fluid pressure which prevails within the adjusting motor and the connecting channel 4.

Figures 3, 4:
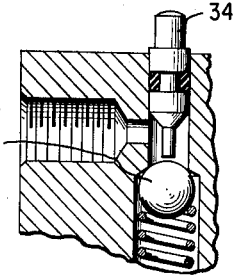
FIGURE 3 is a partial cross sectional view illustrating one embodiment of a construction of a valve body member and shifting pin in accordance with the present invention.
FIGURE 4 is a partial cross sectional view, similar to FIGURE 3, of a modified embodiment illustrating the construction of a valve body member and of a shifting pin in accordance with the present invention.

As is apparent from the showings of FIGURES 1, 2 and 3, the axes of the bores 30, 31 accommodating the shifting pins and valve means and the axes of the connecting channels 2, 4 and 6 are disposed in a common plane, the bore axes extending transversely to the channel axes.

FIGURES 3 and 4 illustrate other simple constructions of the valves and shifting pins as separate structural parts. The shifting pins 34 thereby actuate a conically-shaped valve portion 5 (FIGURE 3) or a ball member 35 (FIGURE 4).

Figure 5:
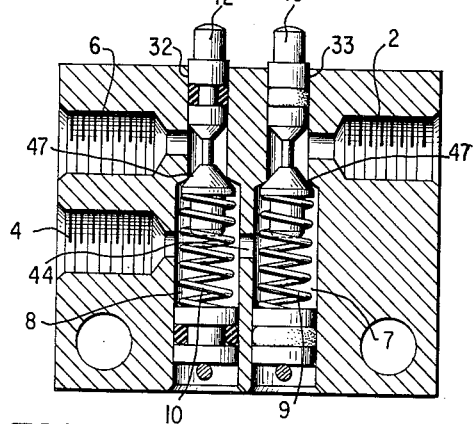
FIGURE 5 is a partial, somewhat schematic view of a lever arrangement for use in a shifting mechanism of the present invention.

FIGURE 5 illustrates a lever arrangement which is suitable for a shifting mechanism in which one shifting pin is always actuated, i.e., in which the shifting mechanism can be brought only into one of two shifting positions. The lever 36 is thereby actuated by a second actuating lever 37 which is adapted to be brought into the other position thereof illustrated in FIGURE 5 in dot and dash line. For that purpose, a draw spring 48 is secured at the lever 37 which is connected at the other end thereof with a stationary point thereby imparting to the lever arrangement 37, 36 a toggle-like action. The adjusting path of the shifting pins 11 and 12 is determined by abutment of the bolt member 40 within the elongated aperture 41 of the lever 36. The draw spring 48 may also be secured with one end thereof directly at the lever 14 or 36 above the bearing bolt member 15. The other end of the spring is then connected to the center between the shifting pins 11 and 12 at the housing 1 of the hydraulic shifting mechanism.

While we have shown and described several embodiments in accordance with the present invention, it is understood that the same is not limited thereto but is susceptible of many changes and modifications within the spirit and scope thereof, and we, therefore, do not wish to be limited to the details shown and described herein, but intend to cover all such changes and modifications as are encompassed by the scope of the appended claim.

We claim:

A mechanically actuated hydraulic shifting mechanism, especially for adjusting installations in motor vehicles, having a housing provided with two bores of substantially identical and parallel construction and extending through the entire housing, each of said bores being provided with a stepped portion and being further provided with portions having respectively different diameters, parallelly arranged spring-loaded valve means in the greater diametered portion of each of said bores sealingly abutting said stepped portion, said housing being provided with a first hydraulic connecting channel opening into the smaller-diametered portion of one of said bores, a second hydraulic connecting channel effectively terminating in the greater-diametered portion of the other of said bores, and a third hydraulic connecting channel effectively terminating in the greater-diametered portion of said one of said bores, line means connecting the smaller-diametered portions of both said bores, said line means having coaxial terminal portions, and means including shifting pins guided respectively within said smaller diametered portions for directly and alternately actuating said valve means so as to selectively connect said second and said third hydraulic connecting channel with said first hydraulic connecting channel, the axes of said bores and the axes of said first, second and third connecting channels and of said line means being disposed in a common plane, said first-named axes extending transversely to said second-named axes, each said first, second and third hydraulic connecting channel comprising portions of differing diameters, the smaller-diametered portion of said first hydraulic connecting channel being coaxial with said line means, the smaller-diametered portion of said second hydraulic connecting channel terminating in said greater-diametered portion of the other of said bores, the smaller diametered portion of said third connecting channel terminating in said greater diametered portion of said one of said bores, said greater-diametered portions of said first, second and third connecting channels being adapted to receive hydraulic line connections, said greater-diametered portions of said first, second and third connecting channels being threaded, said shifting pins being provided with annular grooves, sealing rings received in said grooves and contacting said smaller-diametered portions of said bores, each said spring-loaded valve means comprising a spool-like sealing plug in said greater-diametered portion of each of said bores, a sealing ring carried by said plug and sealingly engaging said greater-diametered portion.

References Cited in the file of this patent

UNITED STATES PATENTS

| | | | |
|---|---|---|---|
| Re. 19,239 | Cochin | July 17, | 1934 |
| 639,673 | Dyblie | Dec. 19, | 1899 |
| 1,187,960 | Austin | June 20, | 1916 |
| 1,436,145 | Birkenmaier | Nov. 21, | 1922 |
| 1,793,850 | Halstead et al. | Feb. 24, | 1931 |
| 1,903,426 | Hinz | Apr. 11, | 1933 |
| 2,446,714 | Milner | Aug. 10, | 1948 |
| 2,606,739 | Gardner | Aug. 12, | 1952 |
| 2,717,806 | Dale | Sept. 13, | 1955 |
| 2,781,781 | Hruska | Feb. 19, | 1957 |
| 2,921,605 | Booth et al. | Jan. 19, | 1960 |
| 2,964,311 | Stelzer | Dec. 13, | 1960 |
| 2,971,090 | Piet et al. | Feb. 7, | 1961 |
| 3,074,433 | Stark | Jan. 22, | 1963 |
| 3,091,255 | Wahlstrom | May 28, | 1963 |

FOREIGN PATENTS

| | | | |
|---|---|---|---|
| 997,725 | France | Sept. 12, | 1951 |
| 478,264 | Italy | Feb. 20, | 1953 |
| 925,868 | Germany | Mar. 31, | 1955 |